United States Patent
Kumar et al.

(10) Patent No.: US 12,081,442 B2
(45) Date of Patent: Sep. 3, 2024

(54) ADMISSION CONTROL FOR LATENCY-CRITICAL REMOTE PROCEDURE CALLS IN DATACENTERS

(71) Applicant: Google LLC, Mountain View, CA (US)

(72) Inventors: Gautam Kumar, Fremont, CA (US); Yiwen Zhang, Ann Arbor, MI (US); Nandita Dukkipati, Palo Alto, CA (US); Xian Wu, Los Angeles, CA (US); Amin Vahdat, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/579,989

(22) Filed: Jan. 20, 2022

(65) Prior Publication Data

US 2022/0239598 A1    Jul. 28, 2022

Related U.S. Application Data

(60) Provisional application No. 63/142,296, filed on Jan. 27, 2021.

(51) Int. Cl.
*H04L 47/2425*    (2022.01)
*H04L 43/0852*    (2022.01)
(Continued)

(52) U.S. Cl.
CPC ...... *H04L 47/2433* (2013.01); *H04L 43/0852* (2013.01); *H04L 47/629* (2013.01); *H04L 67/133* (2022.05)

(58) Field of Classification Search
CPC ............. H04L 47/2433; H04L 43/0852; H04L 47/629; H04L 67/133; H04L 47/12; H04L 47/24; H04L 47/805; H04L 67/60
See application file for complete search history.

(56) References Cited

U.S. PATENT DOCUMENTS 7,047,536 B1 * 5/2006 Duncan ................... G06F 9/547
                                                       719/330
9,819,766 B1 * 11/2017 Nirodi ..................... G06F 9/547
(Continued)

FOREIGN PATENT DOCUMENTS

WO    WO-0232097 A2 *   4/2002   ............. H04L 29/06

OTHER PUBLICATIONS

Extended European Search Report for European Patent Application No. 22153671.7 dated May 30, 2022. 10 pages.

*Primary Examiner* — Jung H Park
(74) *Attorney, Agent, or Firm* — Lerner David LLP

(57) ABSTRACT

A distributed sender driven Admission Control System (ACS) is described herein, leveraging Weighted-Fair Quality of Service (QoS) queues, found in standard NICs and switches, to guarantee RPC level latency service level objectives (SLOs) by a judicious selection of QoS weights and traffic-mix across QoS queues. ACS installs cluster-wide RPC latency SLOs by mapping LS RPCs to higher weight QoS queues, and coping with overloads by adaptively apportioning LS RPCs amongst QoS queues based on measured completion times for each queue. When the network demand spikes unexpectedly to predetermined threshold percentage of provisioned capacity, ACS achieves a latency SLO that is significantly lower than the state-of-art congestion control at the 99.9th-p and admits significantly more RPCs meeting SLO target when RPC sizes are not aligned with priorities.

20 Claims, 9 Drawing Sheets

(51) Int. Cl.
*H04L 47/629* (2022.01)
*H04L 67/133* (2022.01)

(56) References Cited

U.S. PATENT DOCUMENTS

| | | | |
|---|---|---|---|
| 2013/0304796 A1* | 11/2013 | Jackowski | H04L 65/80 709/202 |
| 2015/0189540 A1* | 7/2015 | Jung | H04L 47/2458 370/230 |
| 2021/0117249 A1* | 4/2021 | Doshi | H04L 67/1001 |

* cited by examiner

ADMISSION CONTROL FOR LATENCY-CRITICAL REMOTE PROCEDURE CALLS IN DATACENTERS

CROSS-REFERENCE TO RELATED APPLICATIONS

The present application claims the benefit of the filing date of U.S. Provisional Patent Application No. 63/142,296 filed Jan. 27, 2021, the disclosure of which is hereby incorporated herein by reference.

BACKGROUND

Modern datacenter applications access distributed compute and storage resources via Remote Procedure Calls (RPCs) with stringent requirements for performance and predictability. Spanning multiple tenants and applications, a subset of the RPCs are critical and latency-sensitive with strict microsecond scale tail latency service-level objectives (SLOs), such as interactive revenue-generating user-facing traffic for a retail tenant, real-time maps traffic for a ride-sharing tenant, and storage meta-data. Non-critical RPCs constitute bulk or best-effort transfers such as background analytics.

Because of many recent advances in host and cluster networking, in the typical case, RPCs complete quickly. However, under overload scenarios, even the recent strides in datacenter hardware and software cannot yield predictable performance to RPCs. Datacenter networks are deliberately over-subscribed for statistical multiplexing as it is too expensive to provision for peak bandwidth across all tenants simultaneously. Consequently, network overloads are inevitable and occur when multiple applications surge in their bandwidth usage simultaneously, e.g., under extreme fan-in/fan-out patterns. Under sustained network overload, RPCs can experience degraded latency to the point of making the service effectively unavailable. Under overload, tenants desire to keep their most critical traffic within latency SLOs. Additionally, datacenter operators must isolate critical traffic among individual tenants.

Many congestion control (CC) schemes perform well in maximally using link capacity, keeping losses low, network queues and flow completion times small in times of overload. Yet, CC by itself cannot provide guarantees for RPC latency SLOs: under overload, CC fair-shares the network bandwidth and causes a slowdown for all RPCs, and makes no explicit decisions on which RPCs get admitted into the network in the first place. A second line of work, focusing on providing bandwidth guarantees at the tenant level, does not consider priorities from application's perspective or provide guarantees on RPC Latency SLOs which is what workloads care about. Furthermore, some solutions providing bandwidth guarantees include restrictive assumptions on where overloads occur, or involve centralized entities that are hard to scale for microsecond-scale RPC SLOs in large datacenters.

The sized-based approach which prioritizes small RPCs via strict priority no longer works well in the shared environment since RPC sizes do not necessarily reflect application priorities, particularly across multiple disparate tenants. Instead, datacenters use Quality of Service (QoS) with Weighted-Fair Queuing (WFQ) to assign priority. However, special care is required to map application traffic to QoS queues. Otherwise, an arbitrary mapping yields no guarantees and over time application traffic will want to move to the queues with the highest weights.

BRIEF SUMMARY

The present disclosure provides an Admission Control System (ACS) leveraging the delay characteristics of weighted fair queuing in switches to provide RPC network-latency SLOs in overload situations. The admission control system further explicitly manages the traffic admitted on a per-QoS basis to guarantee a per-QoS RPC latency SLO cluster-wide regardless of the spike of traffic overloads inside the network and in any traffic classes. By managing QoS traffic mix, a priority inversion of RPC latencies across QoS levels is avoided.

In the ACS described herein, end-hosts align the priority classes at the granularity of RPCs to network QoS queues. Typical datacenter RPCs fall into three priority classes: latency-sensitive (LS), throughput-intensive (TI), and best-effort (BE). Hosts map priority classes of RPCs to network QoS 1:1, $QoS_h$, $QoS.$, $QoS_l$, via modifying the packet headers. Switches enforce the standard QoS using weighted fair queues.

Additionally, in the ACS described herein, hosts employ an admission control scheme to manage traffic mix across QoS levels. Hosts measure RPC latency for each QoS level and when the offered load of $QoS_h$ or $QoS_m$ priority class RPCs are high, the admission control system adaptively sets QoS code points on network traffic to ensure RPCs can meet their network-latency SLO. Out-of-profile traffic is downgraded to $QoS_l$ such that the admitted traffic in higher QoS classes meets SLOs. RPC latency is measured independently by each host and no coordination is required across hosts.

The ACS is designed such that RPCs become first-class citizens and hosts make light-weight and local QoS-admission decisions to maximize application-layer objectives. As a result, predictable latency performance can be realized cluster-wide through picking RPC winners and losers explicitly. By measuring RPC latency for each QoS level and realizing explicitly when the offered load is no longer in profile, hosts can make local decisions to admit or downgrade QoS for an RPC—an effective way to ensure that quality network experience is always available for traffic within SLOs. As another result, latency-sensitive traffic is SLO compliant not just at the mean, but also at the $99.9^{th}$-p clusterwide, even at offered network traffic loads as high as 25× of the fabric capacity. In contrast, pFabric and state-of-art congestion control cannot guarantee meeting network-latency SLOs. As a further result, there exists a large admissible region which allows a network designer to choose meaningful network-latency SLO targets for LS and TI traffic such that there is no priority inversion across the high and low priority traffic. Moreover, judicious management of traffic-mix across QoS level can create lower latency for all classes of traffic including the best-effort class.

Aspects of the present disclosure provide a method comprising mapping, by one or more processors of a host device, priority class of a remote procedure call (RPC) to a network quality of service (QoS) level, receiving, from an application, one or more RPCs, and controlling, by the one or more processors of the host device, at RPC granularity, admission of the one or more RPCs to particular QoS levels.

According to some examples, the priority class is one of a plurality of possible priority classes, and the QoS level is one of a plurality of possible QoS levels.

According to some examples, each of the one or more RPCs received from the application includes an indication of priority class. For example, the indication of priority class may be requested by the application. Controlling admission of the one or more RPCs may include determining, by the one or more processors, whether to admit a given RPC on a QoS level that is mapped to the indicated priority class.

According to some examples, controlling admission of the one or more RPCs comprises downgrading particular RPCs from a requested QoS level to a lower QoS level, and issuing the particular RPCs at the downgraded QoS level. Downgrading the particular RPCs may include automatically downgrading non-admitted RPCs to a lowest QoS level. The method may further comprise communicating downgrade information to an application from which the particular RPCs were received.

According to some examples, controlling admission of the one or more RPCs comprises identifying service level objectives for network latency, measuring, with the one or more processors, network latency, and determining, based on the identified service level objectives and measured network latency, whether to admit a given RPC to a particular QoS level. The method may further comprise adjusting, by the one or more processors, an admit probability per destination-host for the particular QoS level at which the RPC issued from an application.

According to some examples, controlling admission of the one or more RPCs comprises measuring RPC latency for each QoS level, and when latency for priority class RPCs is at or above a predetermined threshold, adaptively setting QoS code points on network traffic. Adaptively setting QoS code points may include identifying a service level objective (SLO), and downgrading out-of-profile traffic to a lower QoS class such that the admitted traffic in higher QoS classes meets the identified SLO.

According to some examples, the method may further comprise enforcing, by one or more switches, QoS using weighted fair queues.

According to some examples, the mapping comprises modifying packet headers.

Another aspect of the disclosure provides a system, comprising a memory and one or more processors in communication with the memory. The one or more processors may be configured to map priority class of a remote procedure call (RPC) to a network quality of service (QoS) level, receive, from an application, one or more RPCs, and control at RPC granularity, admission of the one or more RPCs to particular QoS levels.

According to some examples, the priority class is one of a plurality of possible priority classes, and wherein the QoS level is one of a plurality of possible QoS levels.

According to some examples, each of the one or more RPCs received from the application includes an indication of priority class requested by the application, and controlling admission of the one or more RPCs comprises determining, by the one or more processors, whether to admit a given RPC on a QoS level that is mapped to the indicated priority class.

According to some examples, in controlling admission of the one or more RPCs the one or more processors are further configured to downgrade particular RPCs from a requested QoS level to a lower QoS level, and issue the particular RPCs at the downgraded QoS level.

According to some examples, controlling admission of the one or more RPCs comprises identifying service level objectives for network latency, measuring, with the one or more processors, network latency, and determining, based on the identified service level objectives and measured network latency, whether to admit a given RPC to a particular QoS level.

Yet another aspect of the disclosure provides a non-transitory computer-readable medium storing instructions executable by one or more processors for performing a method, comprising mapping priority class of a remote procedure call (RPC) to a network quality of service (QoS) level, receiving one or more RPCs, and controlling, at RPC granularity, admission of the one or more RPCs to particular QoS levels.

DETAILED DESCRIPTION

The Admission Control System (ACS) may be used for storage applications or any other applications as well. The ACS aligns RPC priority with Network QoS. It maps at the granularity of RPCs: latency-sensitive RPCs to $QoS_h$; throughput-intensive to $QoS_m$; and best-effort to $QoS_l$. The ACS sets scheduler weights as per bandwidth requirements of the priority classes. The design organically extends to larger numbers of QoS priority classes.

An Admissible Region characterizes the in-profile traffic and associated RPC network-latency SLOs that can be provided for the $QoS_h$ and $QoS_m$ queues. The datacenter operator uses this characterization to determine the SLOs which are then fed as input to the admission control system.

Admission Control manages a traffic mix across QoS levels. The admission control system uses QoS-downgrade to restrict the amount of traffic admitted to $QoS_h$ and $QoS_m$ to meet RPC network latency SLOs. For this, it uses a distributed algorithm implemented completely at sending hosts to control admit probability for each QoS. A given QoS-mix or bandwidth-usage across the QoS classes translates to delay bounds for them. Overload, e.g., due to traffic-burstiness or misbehaved tenants, upsets the balance and elevates latencies. The ACS observes the elevated latencies and reduces the amount of traffic admitted to the higher QoS classes while downgrading the rest. Applications are notified if an RPC gets downgraded and can control which RPCs they try to admit on the higher QoS classes.

System Overview

Figure 1:
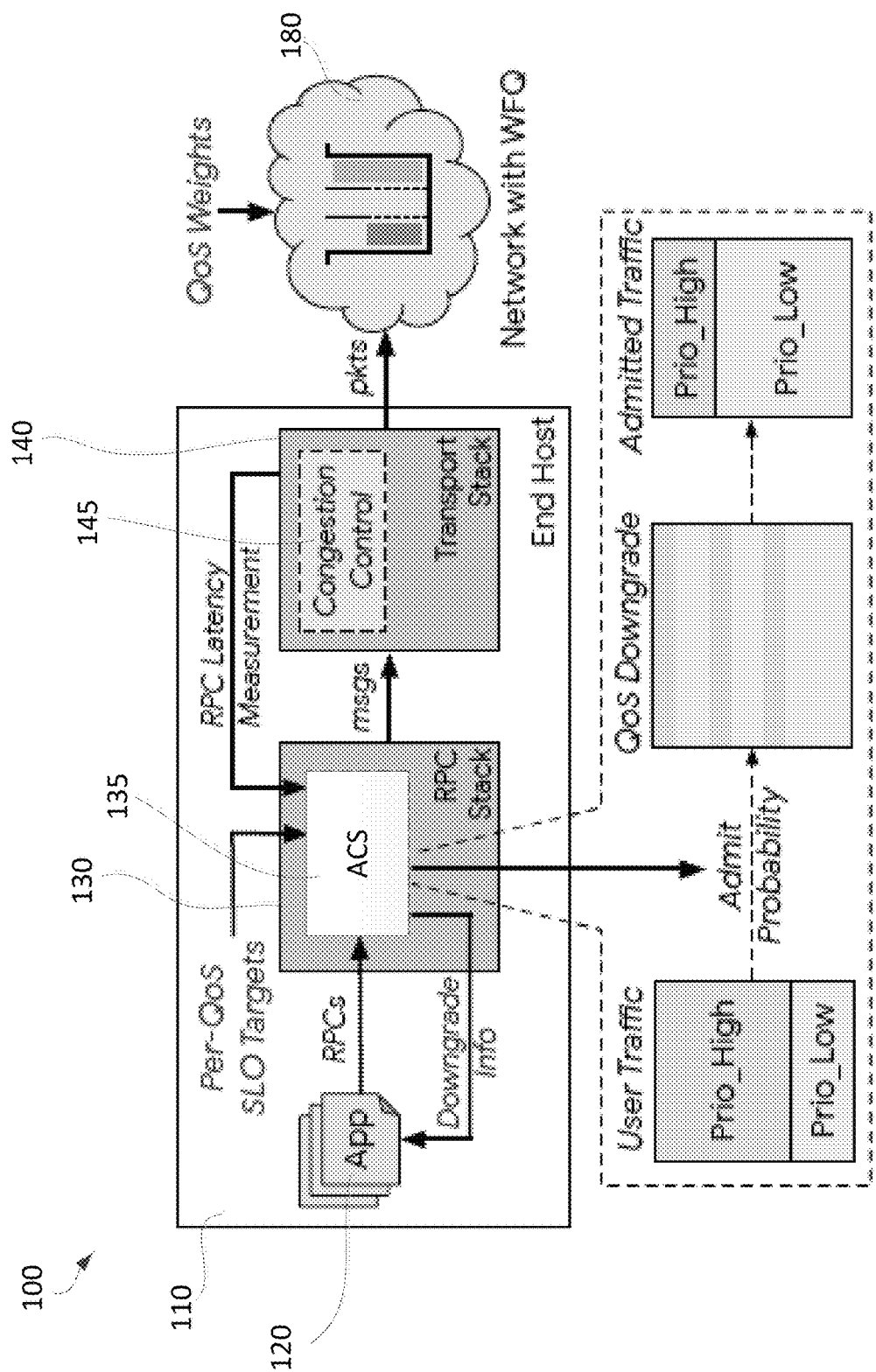
FIG. 1 is a block diagram of an example system according to aspects of the disclosure.

FIG. 1 illustrates an example system 100, wherein admission control system (ACS) 135 resides within an end host 110, which provides packets to a network 180. The ACS 135 may reside within an RPC layer of the end host 110 and communicate with layers above and below the RPC layer. For example, as shown in FIG. 1, the ACS 135 resides within RPC stack 130 and communicates with applications 120 at the higher layer and network or transport stack 140 at the lower layer.

The applications 120 may include any of a variety of types of applications, wherein each application can generate traffic having different priorities. The applications 120 may include, for example, software for executing computer functions, personal functions, business functions, or the like. For example, the applications 120 may include storage applications, processing applications, etc. While the applications 120 may be hosted by the end host 110, they may be owned by a variety of different entities.

While some of the applications 120 may be classified within a particular priority class, many applications, or even jobs executed by the applications, cannot be classified within a single priority class. However, classifying priority at the packet level for each application may be too fine-grained.

The ACS 135 classifies priority at the level of RPCs to QoS classes served with WFQ-scheduling.

Applications 120 issue RPCs. For example, the RPCs may be issued on RPC channels. The applications 120 issuing the RPCs may annotate their priority class, which translates to a requested QoS. For example, latency-sensitive (LS) RPCs are mapped to $QoS_h$; throughput-intensive (TI) RPCs are mapped to $QoS_m$, and best efforts (BE) RPCs are mapped to $QoS_1$. ACS 135 provides SLOs for $QoS_h$ and $QoS_m$. $QoS_l$ may be treated as a scavenger class on which best-effort and downgraded traffic is served and offers no SLOs.

Each RPC channel may map to one or more transport-layer sockets or connections. An operator of the end host 110 provides as an input to ACS 135 the per-QoS network latency SLO targets.

Once an RPC completes, ACS 135 uses its network-latency measurement to adjust the admit probability per destination-host for the QoS at which the RPC ran. In this way, it treats the network as a giant weighted fair queue, and doesn't need signaling of where exactly the overload-points are. It uses admit probability to determine if a given RPC should be admitted across QoS levels to meet RPC network latency (RNL) SLOs, or whether it should instead be downgraded. Downgraded RPCs may be issued at a lowest QoS level. According to some examples, the determination may follow an Additive Increase Multiplicative Decrease (AIMD) control algorithm. Downgrade information is communicated back to the application.

According to some examples, the transport stack 140 may include a congestion control module 145. The congestion control module 145 may work in conjunction with ACS 135. For example, the congestion control module 145 may keep buffer occupancy small, remove packet-losses, and efficiently utilize all available bandwidth. The congestion control module 145 may further observe network overload at a relatively early point in time, thereby enabling differentiation of cases where elevated RPC latency is not a result of overload in the network.

The network 180 may be any type of network that receives packets from an end host. By way of example only, the network 180 may be a datacenter network, distributed computing network, wide area network, local area network, virtual private network, etc. The network 180 may utilize weighted fair queuing (WFQ) to help provide RPC latency SLOs.

Mapping Application Traffic to QoS Classes

Datacenter application traffic typically consists of latency-sensitive (LS), throughput-intensive (TI) and best-effort (BE) traffic. Storage, which is an application with a large source/sink of datacenter traffic, marks its traffic (READ and WRITE RPCs) into the aforementioned classes. ACS maps the three priority classes bijectively to three QoS classes served with WFQ-scheduling: LS traffic to $QoS_h$, TI to $QoS_m$, and BE to $QoS_l$. ACS provides SLOs for $QoS_h$ and $QoS_m$; while $QoS_l$ is treated as a scavenger class on which best-effort and downgraded traffic is served and offers no SLOs. The SLO is specified in the format of (RPC size, tail latency) with tail specified at a given percentile (say 99.9th-p) capped at a minimum value for RPCs smaller than one MTU.

WFQ Delay Analysis

Weighted Fair Queuing (WFQ) is a building block to help provide RPC latency SLOs. Not only does it guarantee a minimum bandwidth for a traffic class, it can also provide delay boundedness. Given N QoS classes, with $\phi 1$, $\phi 2, \ldots, \phi N$ representing the weights of the WFQs that serve the QoS classes, the minimum guaranteed rate gi for class i with a fixed rate r is given by:

$$g_i = \frac{\phi_i}{\sum_J \phi_J} r$$

A lower i indicates a higher WFQ weight. WFQ is also work-conserving. If the instantaneous demand for a QoS class is lower than the rate above, its traffic is completely isolated from the other QoS classes and observes nearly zero queuing-delay. Correspondingly, the bandwidth share of a QoS class may exceed the rate above when other QoS classes have aggregate demands lower than their share as WFQ scheduling is work-conserving. Instead of finding the absolute worst-case delay bounds across all possible arrival curves (with bursts characterized by leaky-buckets), the delay bounds given different utilization levels in the QoS classes are considered. More formally, if the arrival rate of a class i is defined as ai and the sum of arrival rates is defined as a, the QoS-mix is the Ntuple:

$$\left(\frac{a_1}{a}, \frac{a_2}{a}, \ldots, \frac{a_N}{a}\right)$$

The analysis shows how QoS-mix affects WFQ's per-QoS delay bounds in overload situations, wherein the ith element in the QoS-mix may be referred to as $QoS_i$-share. Such an analysis can provide delay bounds given a QoS-mix, but the closed-form equations are restricted to only two QoS levels. Denote x as $QoS_h$-share of the QoS-mix (i.e., the ratio of $QoS_h$ traffic to the total arrival rate, $a_h$; 0<x<1), $QoS_l$-share is (1−x), ratio of QoS weights for $QoS_h:QoS_l$ is $\phi:1$.

Figure 2:
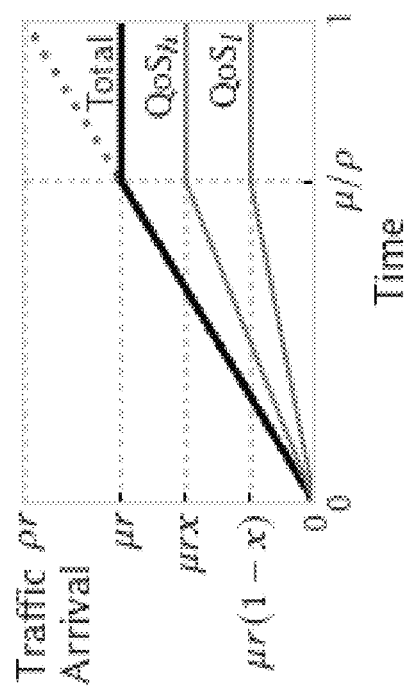
FIG. 2 illustrates an example traffic pattern used in WFQ delay analysis.

FIG. 2 illustrates an example traffic pattern used in WFQ delay analysis. The entire sending period is defined to be one unit of time. Traffic arrives in bursts characterized by a burst parameter, p (p>1, defined in Table 1) which is the slope of the black curve in the figure. For stability, there is an idle phase such that the average load μ within the period is less than 1.0. Thus, the delay bound can be represented as a fraction of the period; by definition, the arriving traffic can be consumed within a single period. This can be denotes as normalized delay bound. With the above traffic model, delay experienced by $QoS_h$ can then be expressed as:

$$Delay_h(x) = \begin{cases} 0, & x \leq \frac{\phi}{\phi+1}\frac{1}{\rho} \\ \mu\left(\frac{\phi+1}{\phi}x - \frac{1}{\rho}\right), & \frac{\phi}{\phi+1}\frac{1}{\rho} < x \leq \frac{\phi}{\phi+1} \\ \mu(1-x)\left(\phi+1-\frac{\phi}{\rho x}\right), & \frac{\phi}{\phi+1} < x \leq 1 - \frac{1}{\phi+1}\frac{1}{\rho} \\ \mu\left(\frac{1}{\rho} - \frac{1}{\rho^2}\right)\frac{1}{x}, & 1 - \frac{1}{\phi+1}\frac{1}{\rho} < x \leq \frac{1}{\rho} \\ \mu\left(1 - \frac{1}{\rho}\right), & x > \frac{1}{\rho} \end{cases}$$

The change of QoS-share results in a different service curve, and thus a different delay representation. As the value of $QoS_h$-share (x in the equations) increases from 0 to 1, delay bound can be divided into five different cases.

Figure 3:
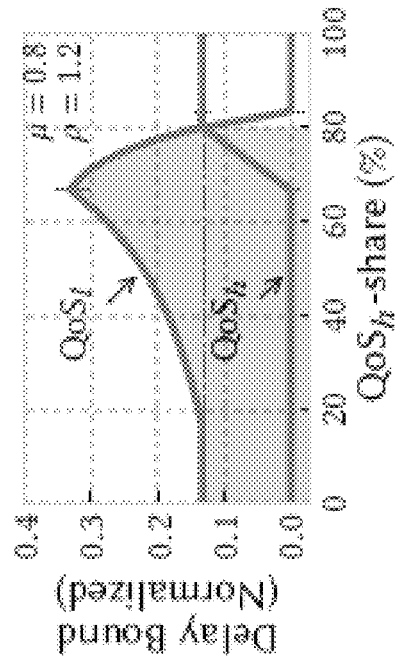
FIG. 3 plots the theoretical worst-case delay per QoS level in a 2-QoS scenario.

FIG. 3 plots the theoretical worst-case delay per QoS level in a 2-QoS scenario. There are two main takeaways from the above formulation. First, QoS-mix affects delay in both QoS classes. As QoS distribution changes, delay from both classes experience different regions (as separated by the vertical dashed lines in the figure). Second, at a certain utilization level of $QoS_h$, priority inversion occurs, where delay in $QoS_h$ exceeds that of $QoS_l$.

Figure 4:
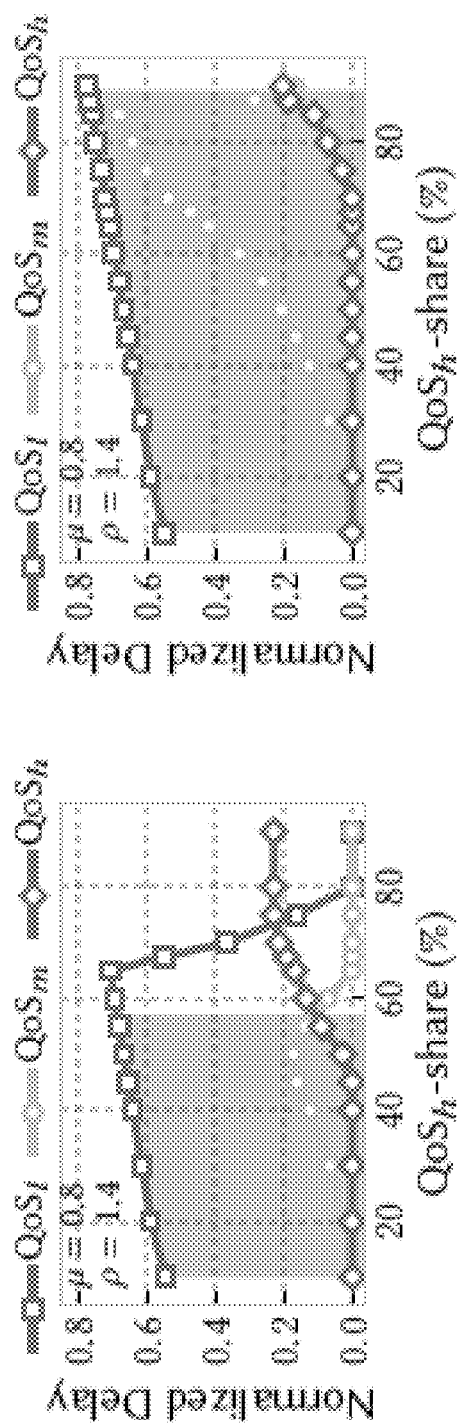
FIG. 4 plots simulated results of a WFQ with 3 QoS levels.

FIG. 4 plots simulated results of a WFQ with 3 QoS levels. As before, the QoS-mix plays an important role in the delay profile among all the QoS levels.

Selecting SLOs as per Admissible Regions

A network operator can determine weights for the WFQs and define SLOs for individual QoS classes. For this, ACS provides requisite tools to the operator to find the admissible region and select an operating point within it. Formally, admissible region for a given set of QoS classes is defined such that each point in it satisfies $\forall k \in \{1, 2, \ldots, N-1\}$, delay_bound$_k \leq$ delay_bound$_{k+1}$ (2) with N QoS classes; lower indices indicating higher priority. As an example, the admissible region is shaded in FIGS. 3 and 4. As QoS-mix changes, points where Equation 2 gets violated are termed as priority inversion points. These points are a function of QoS weights and QoS-mix. In the case where the demand for each QoS class (di) exceeds its minimum guaranteed rate ($\sum_i \phi_i r$), priority inversion happens when it takes longer to process the traffic in $QoS_i$ versus $QoS_{i+1}$, which is proportional to $d_i/\phi_i$. The admissible region for this case can be characterized by $a1/\phi1 \leq a2/\phi2 \leq \ldots \leq aN/$. This gives the network operator a guiding principle to set QoS weights—assigning them proportionally as per the ratio of average load amongst different application priorities. QoS weights may affect the relative delay profiles across the QoS classes within the admissible region. As an example, using extremely skewed QoS weights of 50:4:1 allows for a larger region to be admissible, but implies larger delay bounds for $QoS_m$ (FIG. 4).

ACS provides the network operator a simulation tool that can find the admissible region and delay bounds per QoS-mix given the QoS weights which can be used by the operator to define the SLOs. There is a tradeoff between how tight of an SLO for a QoS versus how much traffic to provide that SLO for. As an example, it might be possible to provide 10 μs SLO for 30% of RPCs or 20 μs SLO for 20% of RPCs.

Distributed Admission Control

ACS is a distributed admission control system for RPCs implemented completely at end hosts utilizing a novel mechanism of QoS-downgrade enabled in WFQs commonly available in commodity switches. ACS provides a bounded per-QoS RPC latency guarantee by enforcing an ideal QoS-mix when traffic goes out of profile. Moreover, it preserves fairness and work conservation when admitting RPCs. Additionally, ACS prevents the race to the top QoS problem.

Probabilistic Admission of RPCs

An admit probability denoted by $p_{admit}$ may be maintained on a per-(src-tenant, dst-host, QoS) basis; RPCs are probabilistically admitted on a given QoS based on $p_{admit}$. If an RPC is downgraded, it may be explicitly notified to the application via an additional field in PRC metadata (lines 8-9 of the example algorithm below). The application sees network overload and QoS downgrades directly, and when not all RPCs can be admitted on the requested QoS, the application has the freedom to control which RPCs are more critical and issue only those at higher QoS to prevent downgrades. Algorithm 1, below, details out how ACS controls $p_{admit}$.

---

Algorithm 1: QoS Downgrade Algorithm

1 Parameters:
   α: additive increment
   β: multiplicative decrement
   target_pctl: target percentile of tail latency
   N: total number of QoS levels
   $QoS_{req}$: QOS level requested by the application
   $QoS_{run}$: granted QoS level to use inside the network
2 Initialization:
   for I ← 1 to N − 1 do
3    admit_prob[i] = 1
4    increment_window[i] = latency_target[i] · target_pctl
5 On RPC Issue (rpc, $QoS_{req}$):
6   $QoS_{run}$ ← $QoS_{lowest}$
7   if rand( ) > p_admit [$QoS_{req}$] then
8    $QoS_{run}$ ← $QoS_{lowest}$
9    prc.is_downgraded ← True
10 RPC_Start(rpc, $QoS_{run}$)
11 On RPC Completion (latency$_{RPC}$, size, $QoS_{run}$):
12  k ← $QoS_{run}$
13  if latency$_{RPC}$ < latency$_{target}$[k] then  » Additive Increase
14    if now-t_last_increase[k] > increment_window[k] then
15     admit_prob[k] ← min(admit_prob[k] + α, 1)
16     t_last_increase[k] ← now
17  else    » Multiplicative Decrease
18    admit_prob[k] ← max(admit_prob[k] − β · size, floor)

---

At each end host, for each tenant or application, ACS collects latency measurements of RPCs per dst-host and QoS level. These latency measurements are only for the network-portion of RPCs. These measurements serve as the primary signal to adjust $P_{admit}$. If the latency is within the target, $P_{admit}$ is increased, otherwise it is decreased. Admit probability translates directly to determine the portion of a tenant's RPCs that needs to be downgraded. While some AQM schemes also perform probabilistic admission-control albeit at packet-level, ACS does so at the granularity of RPCs.

According to some examples, ACS uses additive-increase/multiplicative-decrease (AIMD). ACS increases $p_{admit}$ if the observed RPC latency is below the target, restricted to one update per increment_window (lines 13-16 in the algorithm above). The rationale is that for fairness, the increment in $p_{admit}$ should be agnostic to how many RPCs each tenant is sending. The value of increment_window depends on the percentile at which the SLO is defined, e.g., if the SLO is defined at the $99.9^h$-p, the increment_window is higher than the case where it is at the $99^h$—the algorithm is more conservative in increasing the admit probability when the SLO is for a higher tail.

If the RPC misses the specified SLO, the admit probability is decreased by a constant amount per SLO miss (lines 17-18). To achieve fairness across tenants, when overload occurs, a tenant sending more RPCs should expect a larger decrease in its admit probabilities versus a tenant sending fewer RPCs. RPC-level clocking may be used to achieve this; the constant decrement in the admit probabilities implies that the overall decrease in a given time interval becomes proportional to the RPCs of the tenant that miss the SLO. An implication of this is that tenants who are sending RPCs within their fair-share keep their admit probabilities close to 1.0. A threshold may be set, below which the admit probability does not further decrease. This is to prevent starvation which can happen when the admit probability drops to zero, in which case, no new RPCs get admitted on the requested QoS resulting in no further latency measurement for that tenant on the requested QoS to increase the admit probability.

To handle different RPC sizes, the algorithm described above may be augmented. For example, the latencytarget may be scaled as per the RPC size, i.e., larger RPCs have a higher target. Moreover, the multiplicative decrease may be made proportional to the size of the RPC, such that an SLO miss on a 10-packet RPC is considered equivalent to SLO misses on ten 1-packet RPCs. In other words, it doesn't matter if a tenant is issuing 10-packet RPCs or 1-packet RPCs, it will converge to its fair share.

The SLOs provided by the admission control system are indicated in the following table:

| | Guarantees |
|---|---|
| Per-Priority | All admitted traffic meets RNL SLOs. |
| | Atleast $r \dfrac{\phi_1}{\sum \phi} \dfrac{\mu}{l^\beta}$ traffic is admitted in $QoS_i$ except the lowest QoS. |
| Per-Tenant | All admitted traffic meets RNL SLOs. Admitted traffic is divided amongst tentants as per max-min fairness. |

Systematic Use of QoS

The trifecta of aligning priorities, providing per-QoS SLOs, and admission control to maintain a QoS-mix enables a systematic use of datacenter QoS. ACS maps priority to network QoS at the granularity of RPC. Guarantees on RNL SLOs for all QoS classes other than the lowest class (to which the excess RPCs are downgraded) helps with setting expectations at each QoS level instead of blindly going for the highest QoS as a safe choice for applications. ACS's admission control algorithm maintains an ideal QoS-mix, by downgrading excess traffic to lowest class, thereby incentivizing applications to be well-behaved when using higher QoS.

SLOs and Adversarial Cases

With the characterization above, the SLOs provided by ACS may be formalized both in terms of per-priority-level and per-tenant. While ACS's admission control provides latency SLOs for all admitted RPCs, it doesn't provide guarantees on what fraction of RPCs are admitted on a per-tenant basis. Fraction of per-tenant admitted RPCs depends on how many other tenants are in the system as ACS divides the available QoS bandwidth evenly across them. One can augment ACS to provide per-tenant throughput guarantees (such as RPCs) with a centralized RPC quota server wherein tenants across hosts periodically request RPC quotas.

The second aspect pertains to ACS's AIMD algorithm. ACS is more conservative in increasing the admit probability versus decreasing it. This is because ACS is designed to meet SLOs at the extreme tails, 99th-p or even 99.9th-p. An adversarial pattern here is ON/OFF traffic bursts that lower the admit probability which then takes some time to ramp up. In such cases, ACS may not maximize the number of RPCs that can be admitted, but it will remain SLO-compliant for latency.

Example Implementations

In one example, ACS may be implemented in a production RPC stack over Kernel/TCP. A complete RPC operation in the context of storage consists of a request followed by a response. Users desire an SLO on overall RPC latency, which depends on many factors including CPU, storage, networking and application-layer bottlenecks such as thread scheduling delays. From a networking perspective, RPC network latency (RNL) is the portion of RPC latency impacted from network overloads. Focusing on the payload-portion of the RPC, the total data transmitted in a complete RPC operation, including a request followed by a response, is dominated by the side which contains the actual payload of the RPC. A response of a READ RPC is much larger than the request (200:1 on average), and the request of a WRITE RPC is much larger than its response (400:1 on average).

RPC Network Latency

Figure 5:
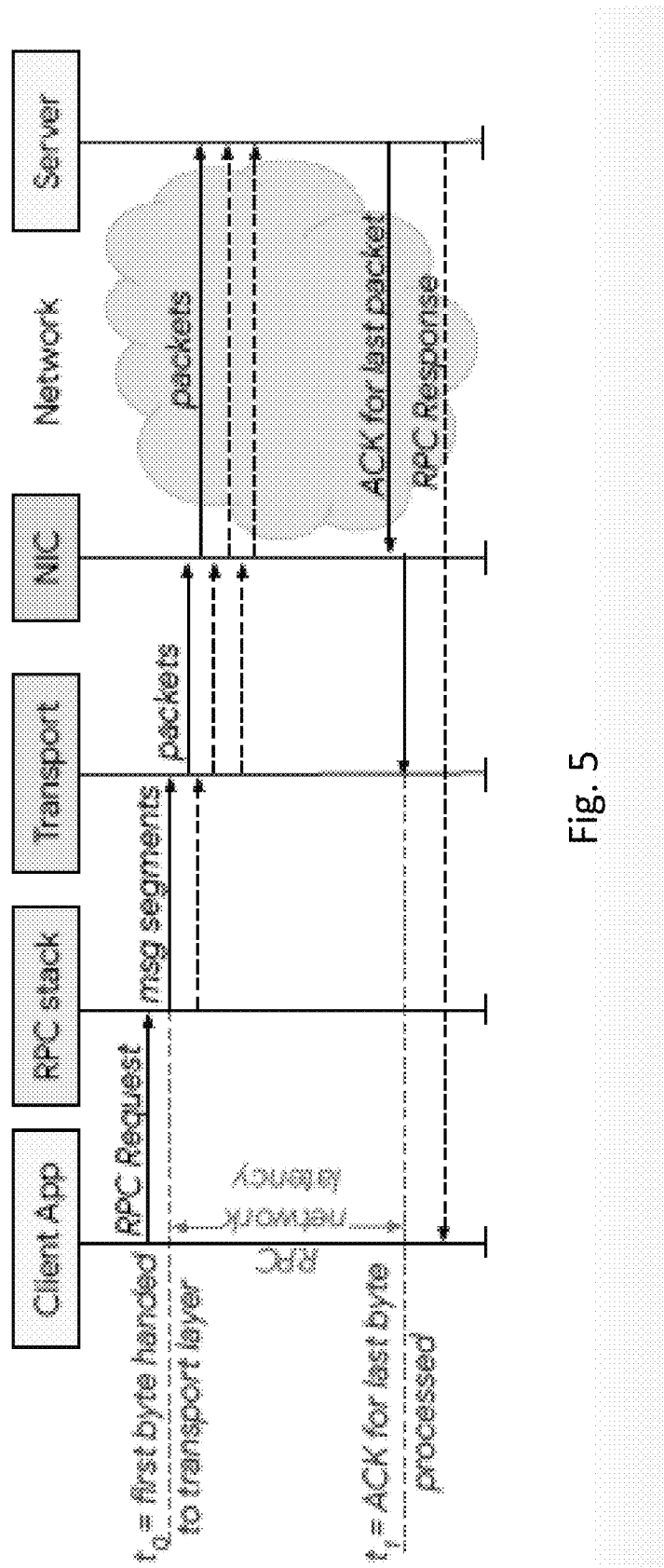
FIG. 5 illustrates an example latency breakdown of a WRITE RPC.

FIG. 5 shows the life of a WRITE RPC. RPC network latency is defined by t1-t0 where t0 denotes the time when the first packet of the RPC is handed to the L4 transport layer, e.g., TCP and t1 is the epoch when the last packet of the RPC is acknowledged at the transport. There are two kinds of delays an RPC experiences in the networking stack: those it incurs because of network overload that that should be included in network latency, and other forms of host delays unrelated to oversubscription in the network, which should be excluded. RPC network-latency includes queueing delay in host experienced due to congestion control backoff as a direct signal of network overload: if a QoS class is experiencing an overload, then congestion control would back off to create queuing in the host that elevates t1-t0. Queuing delay in the host induced by CC backoff is a signal of overload for a well-functioning CC as the network queues/delays/losses are kept minimal.

Precisely measuring RPC network-latency in production stacks may be challenging because RPC boundaries may not be known precisely at the transport layer as is the case with TCP, and RNL can still include delays unrelated to network overload, such as delays due to insufficient CPU, interrupts, flow-control or kernel scheduler.

Since RPC boundaries are not precisely known at TCP layer, one approach is to measure RNL at sendmsg boundary for which both t0 and t1 can be measured. As ACS's algorithm incorporates RPC-size in the SLO, this works well even if an RPC is multiple sendmsg calls.

In newer networking stacks that are more amenable to information sharing across RPC-(or Op-)layer and the transport-layer, the RPC layer can precisely know t0 and can additionally know t1 by the completion issued when the acknowledgement for the last byte has been received by the transport. Additionally, such stacks also enable signaling if the network-latency measurement is elevated due to CPU overload and such signals can be used in the ACS's algorithm to filter away RPCs not impacted by network overload.

Figure 6A:
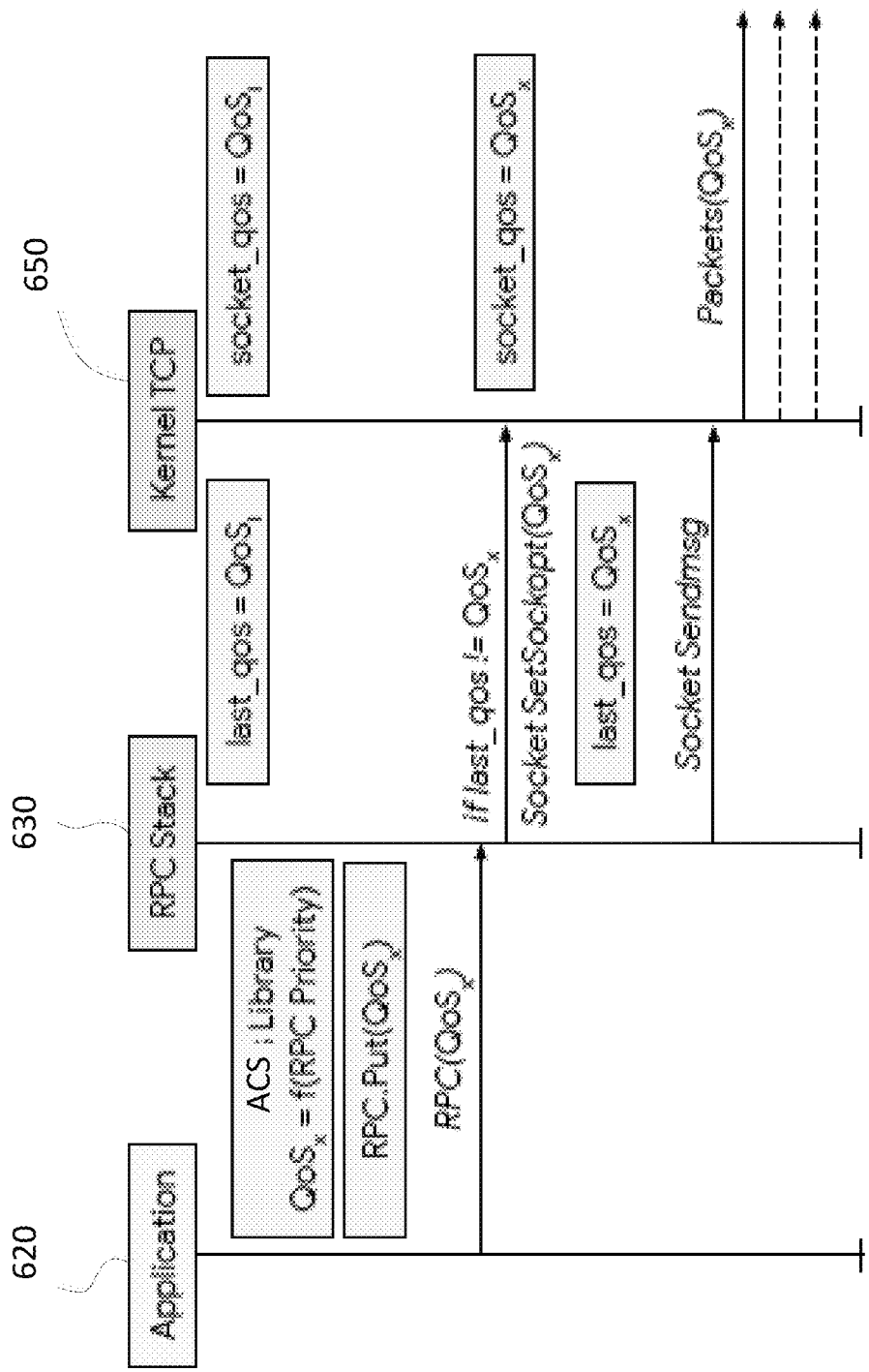
FIG. 6A illustrates an example implementation of ACS according to aspects of the disclosure.

FIG. 6A illustrates an example implementation, where QoS is set and enforced on a per-RPC basis based on priority input from an application 620. The application 620 uses a centralized library for Priority-to-QoS mapping. When sending an RPC, the application 620 passes the QoS information to RPC stack 630. The RPC stack 630 checks whether the QoS of the outgoing RPC is the same as the QoS of the previously sent RPC on the same TCP connection between client and server. If the QoS are different, the RPC stack 630 invokes a system call to configure a new QoS codepoint on the underlying TCP socket, before passing the data to kernel TCP 650. The kernel TCP 650 marks the packets of outgoing RPCs with the most recently configured QoS codepoint on the socket.

Applications can interleave RPCs of different priorities on the same TCP connection, e.g. issuing RPCs in the order of LS, BE, LS, TI. However, applications tend to minimize interleaving of priorities since it can cause head-of-line blocking at various resource contention points in the system. Depending on the extent of interleaving, there could be a non-trivial CPU cost due to the system call overhead that is required to change the QoS codepoint on the TCP connection. In cases of frequent interleaving, a mitigation could be to maintain a per-QoS TCP connection between Client/Server, as in our prototype, and send the RPC on the appropriate TCP connection based on the selected QoS. However, this approach increases the number of connections N-fold for N QoS queues.

At the switches, ACS does not require any new implementation. The non-preemptive nature of switch buffers is a source of priority inversion. This is different from the priority inversion stemming from WFQ scheduling that is characterized in ACS's admissible region formulation. Priority inversion in switch buffers occurs if a burst of $QoS_l$ packets fill up the switch buffers and cause loss for subsequently arriving $QoS_h$ packets. To alleviate this, ACS relies on switch buffer carving that bounds the buffer usage per QoS, and congestion control that keeps buffer occupancy small, minimizes packet-losses, and efficiently utilizes link bandwidth. Congestion control further helps ACS as it observes network overload first and thereby enables it to differentiate cases where the elevated RPC latency is not a result of overload in the network.

Figure 6B:
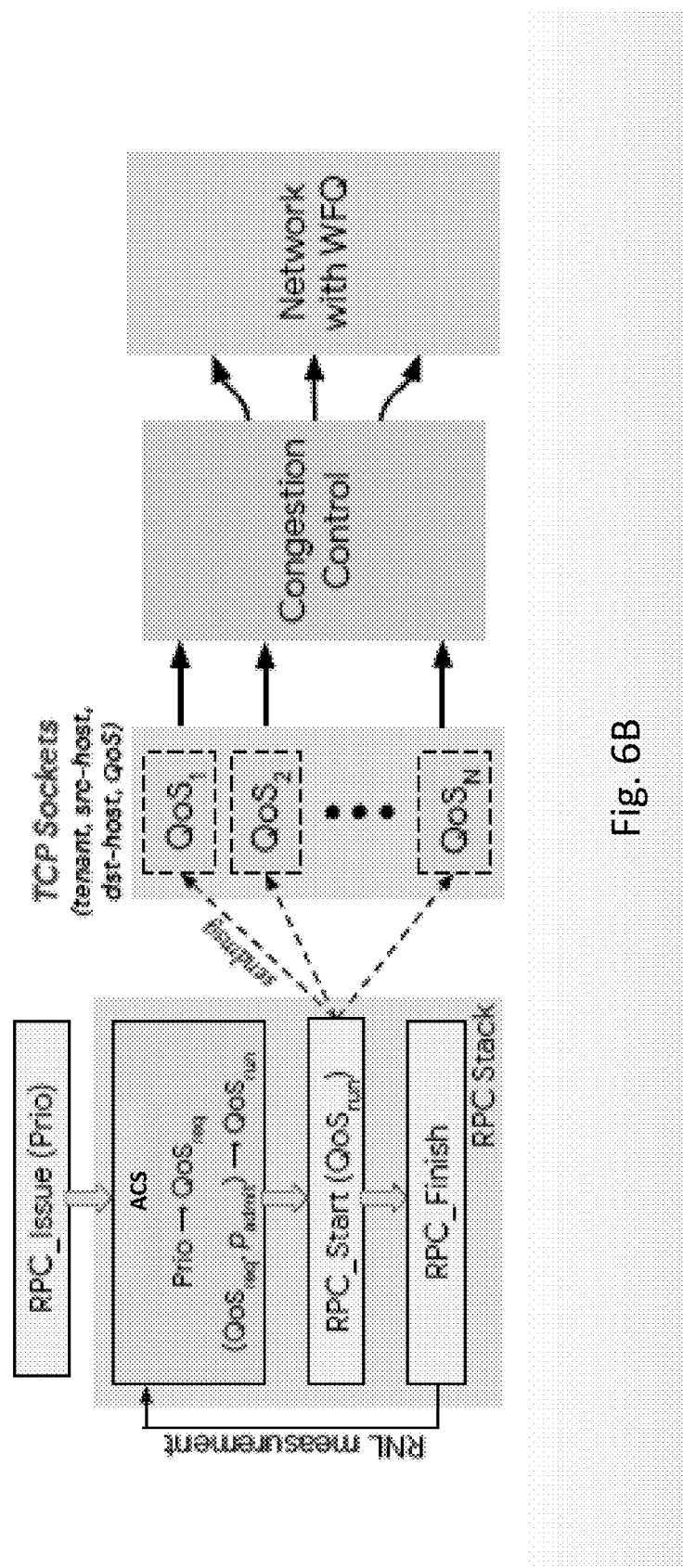
FIG. 6B illustrates another example implementation of ACS, using kernel/TCP, according to aspects of the disclosure.

FIG. 6B illustrates an example implementation of ACS using kernel/TCP. The ACS algorithm runs on per RPC channel. Each host maintains per-QoS TCP sockets to the servers to which it is issuing RPCs. At RPC issue time, the QoS on which the RPC should run is selected based on requested priority class and admit probability. On RPC completion, the latency measurement is fed into the ACS's algorithm.

Other Implementation Considerations

There are several practical considerations in real stacks. For kernel/TCP, RPCs are mapped to TCP sockets which are tied to a QoS. For example, the TCP sockets may be selected by a differentiated services code point (DSCP) value in the IP header) of an RPC. Changing the QoS may require a system call. In practice, the mapping between RPC channels and TCP connections is not bijective with respect to priority classes. For example, there could be interleaving of critical and besteffort RPCs on the same TCP connection. Under ACS's design, these interleavings imply a system call to change the QoS on the socket and can be prohibitive because of their CPU cost depending on the extent of interleaving. A solution would be to maintain TCP connection per QoS and selecting the right connection at RPC issue time, though this increases the number of connections N-fold for N QoS queues. Other networking stacks offer different options with different constraints.

Complements to ACS

ACS's admissible region formulation focuses on priority inversion points stemming from WFQ scheduling. Another source of priority inversion is the non-preemptive nature of switch buffers. For example, priority inversion may still occur if a burst of $QoS_{low}$ packets fill up the switch buffer and cause loss for subsequently arriving $QoS_{high}$ packets. To alleviate this style of priority inversion in practice, ACS may rely on buffer carving and congestion control. Buffer carving in switches puts bounds on the buffer usage per QoS. Congestion control keeps buffer occupancy small, removes packet-losses, and efficiently utilizes all available bandwidth. Congestion control further helps ACS as it sees network overload first and enables us to differentiate cases where the elevated RPC latency are not a result of overload in the network.

Irrespective of the input QoS-mix, ACS's admission control converges to the ideal QoS-mix based on which the SLOs have been set. ACS preserves its ability to closely track RPC latency SLOs in a larger-scale under different communication patterns. The fairness and efficiency aspects of ACS described above translate well to larger scales. ACS provides RPC-level isolation with guaranteed per-QoS latency SLOs.

Hardware

ACS may be implemented across different parts of network interface card (NIC) hardware. Such hardware may be capable of recognizing priority carried in a message from an upper layer stack and maps priority 1:1 with network QoS code points on a per-message basis. For example, the NIC may include a hardware transport or may be implemented in conjunction with a transport. The transport may have access to RPC latency. For a transport implemented completely in hardware, ACS may be implemented alongside it, such as through a remote direct memory access layer (RDMA).

Figure 7:
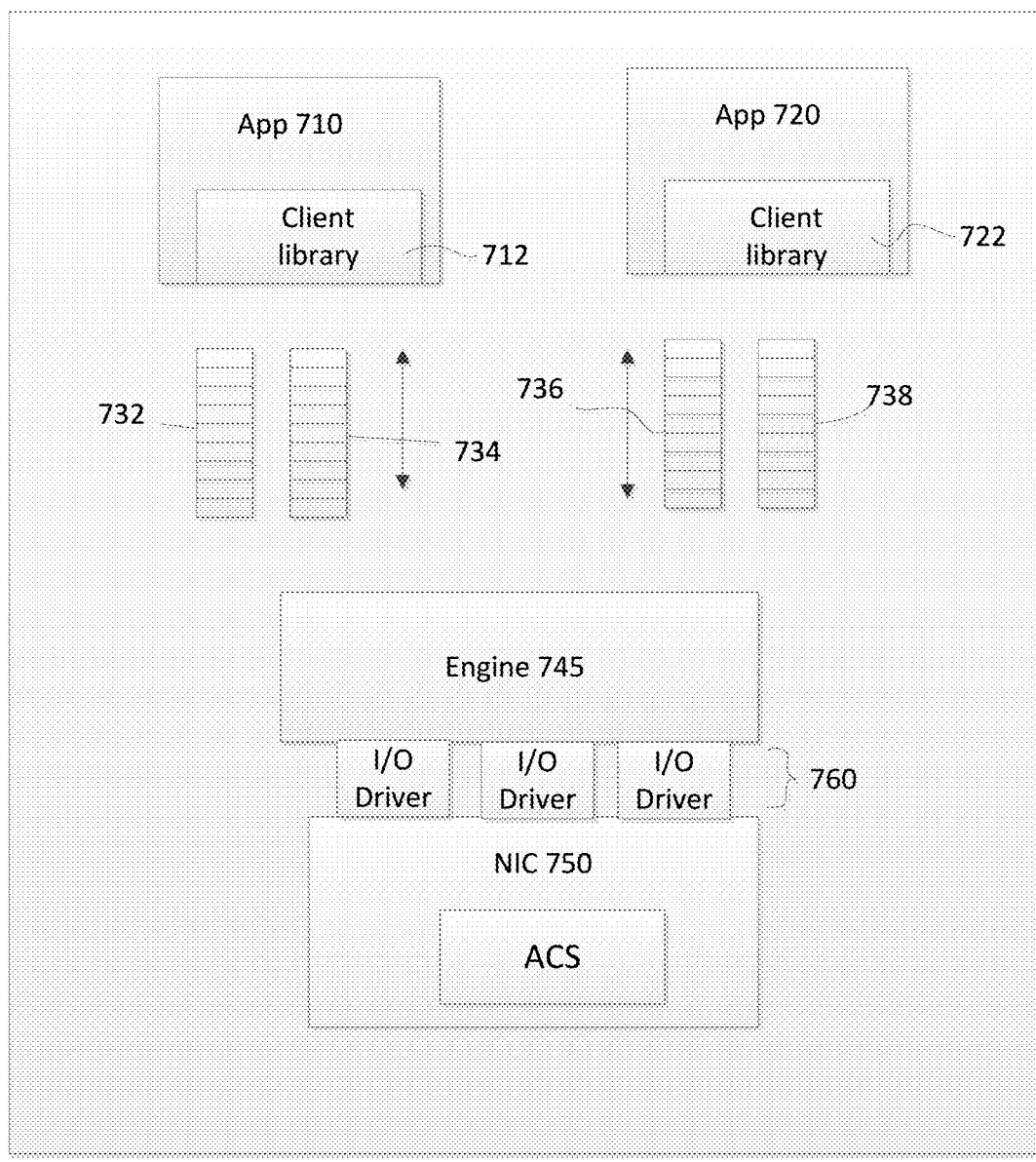
FIG. 7 is a block diagram of an example system according to aspects of the disclosure.

FIG. 7 illustrates a system 700, including application processors 710, 720 in communication with a NIC 750. In some examples, such communication may exist through shared memory 732, 734. The system 700 may be implemented as a system of devices on a motherboard, or any other configuration of electronically coupled computing devices. For example, the system may include a backplane interconnecting peripherals, an expansion card interface, or the like. The connection between the computing devices may be hard-wired connections, wireless connections, or any other type of connections. As yet another example, the computer system 700 may include TCP/IP, 802.33, Ethernet, InfiniBand, or any other type of network.

The application processors 710, 720 may run application software. Each application processor 710, 720 may run one or more applications, and the applications run on one processor may be different than the applications run on other processors. By way of example only, processor 710 may run a remote procedure call (RPC) application, while processor 720 runs a video streaming application. While only two processors 710, 720 are shown, it should be understood that any number of processors may be included, and may run any number of different applications.

Each application may have an associated client library 712, 722. The client libraries 712, 722 may include code, for example, for the applications to interact with application program interfaces (APIs). The APIs may be, for example, in-memory storage systems using RDMA, RPC, or any other type of API.

The shared memory 732, 734 may be, for example, shared memory rings, or any other type of memory. The shared memory 732, 734 may provide memory-based queues or other information. In some examples, the shared memory 732, 734 is backed by temporary file storage. Moreover, application data may be communicated to the NIC 750 through memory registration, interprocess shared memory, anonymous-backed heap memory, etc.

Engine 745 may be a packet processing pipeline. For example, the engine 745 may be implemented in a framework supporting high performance packet processing entities. The engine 745 may interface with one or more input/output (I/O) drivers 760, which provide facilities for interacting with hardware components, communicating between threads, and/or communicating with other user-space processes. The engine 745 may include one or more processing cores. The I/O drivers 760 may all implement a same unified API. While several I/O drivers 760 are shown, any number of I/O drivers may be included. In some examples, the number of I/O drivers 760 may correspond to a number of cores in the NIC 750.

The NIC 750 may be, for example, a chip or circuit board installed in the computing system 700. The NIC 750 may provide a dedicated network connection to the computing system 700. As shown, the NIC 750 may host ACS, which may map RPC priorities to QoS-queues with critical RPCs issued on higher QoS-classes, and execute an admission-control algorithm that uses a new mechanism of QoS-downgrade to control the amount of traffic admitted on a given QoS. According to some examples, the admission control algorithm may be implemented completely at sending hosts.

Figure 8:
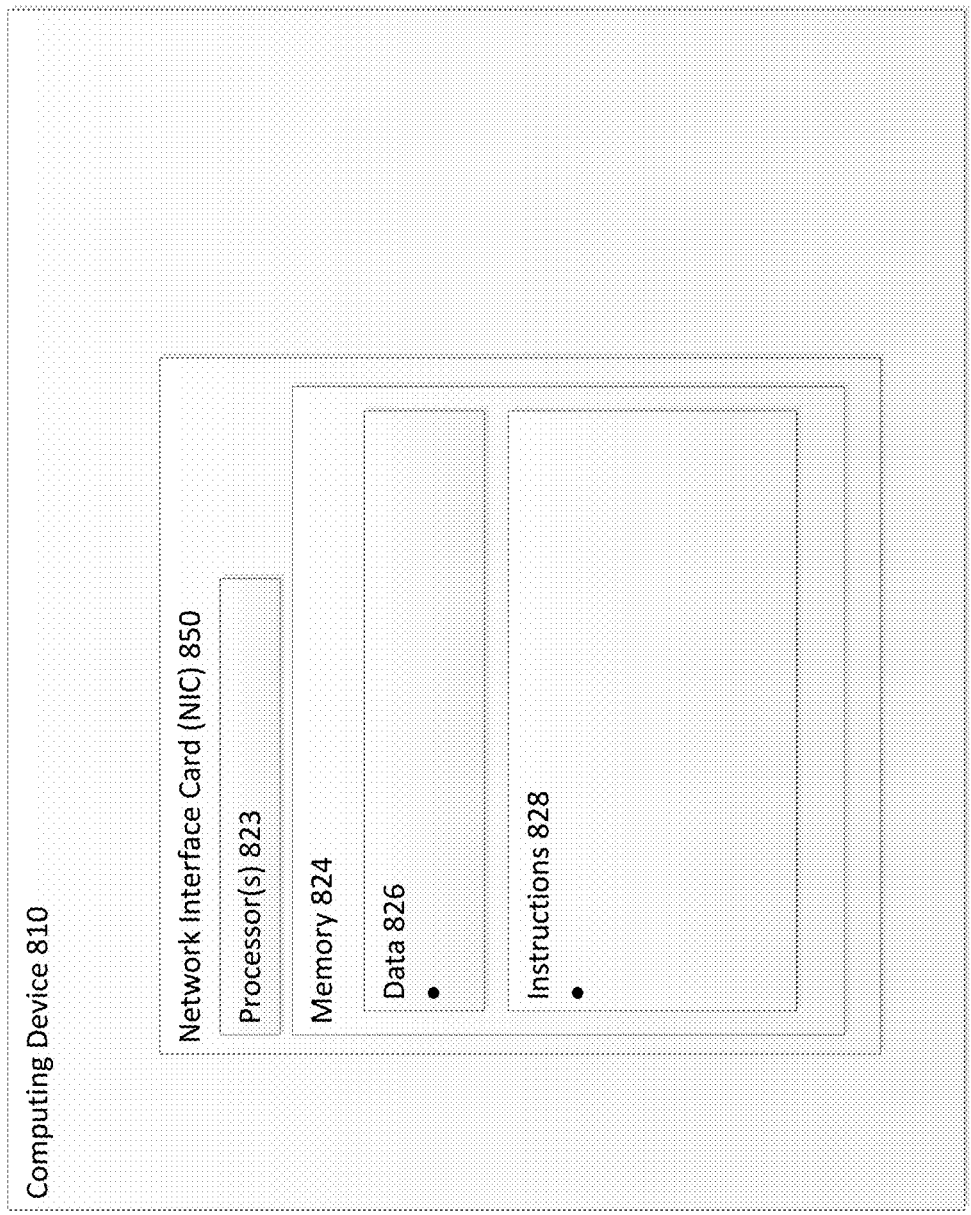
FIG. 8 is a block diagram of another example system according to aspects of the disclosure.

FIG. 8 provides another example of a system implementing ACS on a NIC. It should not be considered as limiting the scope of the disclosures or usefulness of the features described herein. As shown, computing device 810 includes NIC 850. The computing device 810 may be, for example, an end host, server, or other computing device. According to some examples, the computing device 810 may further include other components not shown, such as a hypervisor with guests, memory, additional processing components, input/output, etc.

As shown in this example, NIC 150 includes one or more processors 823 and memory 824 including data 826 and instructions 828. Memory 2824 may store information that is accessible by the processors 823, including the instructions 828 that may be executed by processor 823 and the data 826. The memory 824 may be of any type of memory operative to store information accessible by the processors 824 including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The systems and methods herein may include different combinations of the foregoing, whereby different portions of the instructions and data are stored on different types of media.

The instructions 828 may be any set of instructions to be executed directly, such as machine code, or indirectly, such as scripts, by the processors 823. For example, the instructions 828 may be stored as computer code on the computer-readable medium. The instructions 828 may be stored in object code format for direct processing by the processors 823 or in any other computer language including scripts or collections of independent source code modules that are interpreted on demand or compiled in advance.

The data 826 may be retrieved, stored or modified by the processors 823 in accordance with the instructions 828. For instance, although the system and method is not limited by any particular data structure, the data 826 may be stored in computer registers, in a relational database as a table having a plurality of different fields and records, extensible markup language ("XML") documents or flat files. The data may also be formatted in any computer-readable format.

The one or more processors 823 can be any conventional processor, such as a commercially available CPU. Alternatively, the processor can be a dedicated component such as an ASIC or other hardware-based processor. Although not necessary, the computing device 810 may include specialized hardware components to perform specific computing processes. As another example, the one or more processors 823 may be responsible for handling basic system instructions 828 including running applications, handling calculations and computations, and processing inputs from devices such as a keyboard, mouse, microphone, etc. The processors may receive queries from computing devices (not shown) and process those queries, for example, by accessing memory 824, retrieving the queried information, and sending the information to the requesting computing device. Processors 823 may also be responsible for mapping RPC priorities to QoS-queues with critical RPCs issued on higher QoS-classes, and downgrading QoS to control the amount of traffic admitted on a given QoS.

Computing device 810 may utilize Ethernet cards or network adapters, such as NIC 850, to connect to a network. Although FIG. 8 functionally illustrates the processors, memory, guest virtual machines and other elements of computing device 810 as being within the same block, the processors, computer, computing device, or memory can actually comprise multiple processors, computers, computing devices, or memories that may or may not be stored within the same physical housing. For example, the memory can be a hard drive or other storage media located in a housing different from that of computing device 810. Accordingly, references to a processor, computer, computing device, or memory will be understood to include references to a collection of processors, computers, computing devices, or memories that may or may not operate in parallel. For example, the computing device 810 may include server computing devices operating as a load-balanced server farm. And although some functions described below are indicated as taking place on a single computing device having a single processor, various aspects of the subject matter described herein can be implemented by a plurality of computing devices, for example, communicating information over network.

Example Methods

Figure 9:
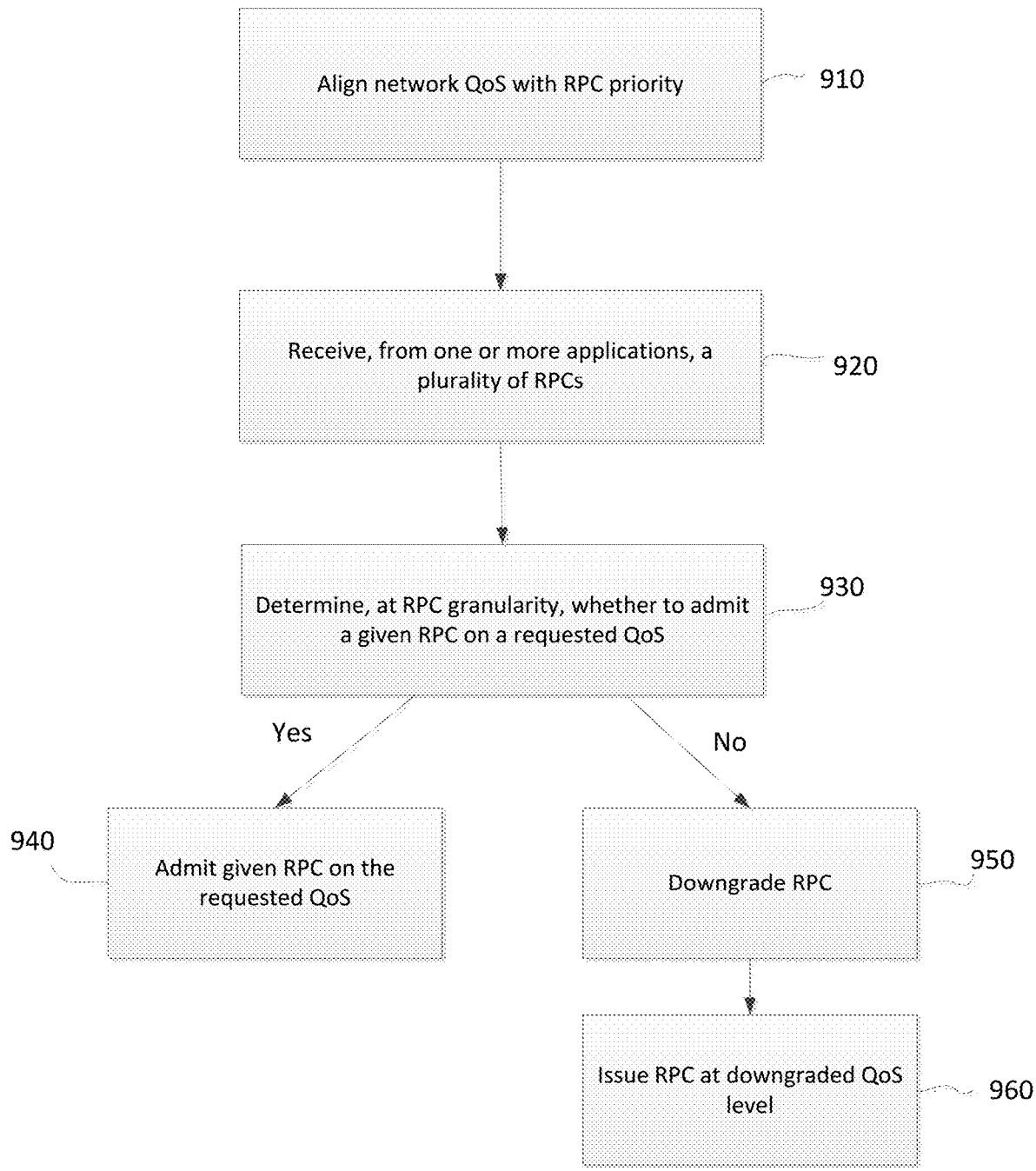
FIG. 9 is a flow diagram illustrating an example method according to aspects of the disclosure.

FIG. 9 provides a flow diagram illustrating an example method 900 of admission control. While the operations are illustrated and described in a particular order, it should be understood that the order may be modified and/or operations may be performed in parallel. Moreover, operations may be added or omitted.

In block 910, network QoS is aligned with RPC priority. For example, priority classes for RPCs may include latency sensitive (LS), throughput intensive (TI), and best efforts (BE), where LS is a highest priority and BE is a lowest priority. According to other examples, different priority classes may be defined. While three priority classes are described in this example, additional or fewer priority classes may be defined. Applications, such as storage or other types of applications, may mark traffic into the priority classes. For example, READ and WRITE RPCs may be issued with priority class designations, such as by including priority class designations in a header or other portion of the RPC. The priority classes may ne mapped to QoS classes served with WFQ scheduling. For example, such QoS classes may include $QoS_h$ for high priority, $QoS_m$ for medium priority, and $QoS_l$ for low priority. LS RPCs may be mapped to $QoS_h$, TI RPCS may be mapped to $QoS_m$, and BE RPCs may be mapped to $QoS_l$. SLOs may be provided for some of the QoS classes, such as higher priority classes $QoS_h$ and $QoS_m$. Other classes, such as lower priority class $QoS_1$, may be used for lower priority or downgraded traffic. While the present example describes a direct mapping of 3 priority classes with 3 QoS classes, it should be understood that the number of priority classes need not be the same as the number of QoS classes. For example, ACS may utilize more QoS classes than priority classes, or more priority classes than QoS classes. According to other examples, a number of priority classes may be adjusted to correspond to the number of QoS classes.

In block 920, a plurality of RPCs are received from one or more applications. For example, the RPCs may be received by ACS in an RPC layer of an end host. According to some examples, the end host may also host one or more of the applications from which the RPCs are received. The received RPCs may each include an indication of priority class. For example, such indication may be included in a header or other portion of the RPC. The indication of priority may be issued by, for example, the application from which the RPC was received.

In block 930, it is determined whether to admit a given RPC on a QoS class mapped to the indicated priority class. For example, if a received RPC indicates priority class LS, it may be determined whether to admit the RPC on $QoS_h$, which is mapped to LS, or not. The determination may be based on, for example, an admit probability algorithm. Such algorithm may follow an AIMD control or other technique.

If it is determined to admit the given RPC on the QoS mapped to the requested priority class, in block 940 the given RPC is admitted on the QoS class mapped to the requested priority class. However, if it is determined not to admit the given RPC on the QoS class mapped to the requested priority class, in block 950 the given RPC may be downgraded. For example, if the give RPC was issued with LS priority class, but it was determined in block 930 not to admit the given RPC on $QoS_h$, then the given RPC may be downgraded to $QoS_m$ or $QoS_l$. According to some examples, any RPCs not admitted on the requested QoS class may automatically be downgraded to a lowest QoS class. According to other examples, non-admitted RPCs may be downgraded to a class at a next lower level than the requested class. In other examples, the class to which non-admitted RPCs are downgraded may depend on other factors, such as an amount of traffic currently being served on one or more classes, etc. For example, the downgrade level may be determined such that RPCs can meet SLOs. In block 960, the given RPC is issued at the downgraded QoS level.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   mapping, by one or more processors of a host device, priority class of a remote procedure call (RPC) to a network quality of service (QoS) level;
   receiving, from an application, one or more RPCs; and
   controlling, by the one or more processors of the host device, at RPC granularity, admission of a given RPC of the one or more RPCs to a particular QoS level using an admit probability for the particular QoS level, wherein the controlling comprises downgrading the given RPC from a requested QoS level to a lower QoS level; and
   adjusting the admit probability for the requested QoS level based on measuring network latency of RPCs processed at the requested QoS level.

2. The method of claim 1, wherein the priority class is one of a plurality of possible priority classes, and wherein the QoS level is one of a plurality of possible QoS levels.

3. The method of claim 1, wherein each of the one or more RPCs received from the application includes an indication of priority class.

4. The method of claim 3, wherein the indication of priority class is requested by the application.

5. The method of claim 3, wherein controlling admission of the given RPC comprises determining, by the one or more processors, whether to admit the given RPC on a QoS level that is mapped to the indicated priority class.

6. The method of claim 1, wherein controlling admission of the given RPC comprises:
   issuing the given RPC at the lower QoS level.

7. The method of claim 1, wherein downgrading the given RPC comprises automatically downgrading non-admitted RPCs to a lowest QoS level.

8. The method of claim 1, further comprising communicating downgrade information to an application from which the given RPC was received.

9. The method of claim 1, wherein controlling admission of the given RPC comprises:
   identifying service level objectives for the network latency;
   determining, based on the identified service level objectives and the measured network latency, whether to admit the given RPC to the particular QoS level.

10. The method of claim 9, wherein the adjusting, by the one or more processors, comprises adjusting the admit probability per destination-host.

11. The method of claim 1, wherein controlling admission of the given RPC comprises:
    measuring RPC latency for each QoS level; and
    when latency for priority class RPCs is at or above a predetermined threshold, adaptively
    setting QoS code points on network traffic.

12. The method of claim 11, wherein adaptively setting QoS code points comprises:
identifying a service level objective (SLO); and
downgrading out-of-profile traffic to the lower QoS class such that traffic admitted in higher QOS classes meets the identified SLO.

13. The method of claim 1, further comprising enforcing, by one or more switches, QoS using weighted fair queues.

14. The method of claim 1, wherein the mapping comprises modifying packet headers.

15. A system, comprising:
memory; and
one or more processors in communication with the memory, the one or more processors configured to:
map priority class of a remote procedure call (RPC) to a network quality of service (QoS) level;
receive, from an application, one or more RPCs; and
control, at RPC granularity, admission of a given RPC of the one or more RPCs to a particular QoS level using an admit probability for the particular QoS level, wherein the controlling comprises downgrading the given RPC from a requested QoS level to a lower QoS level; and
adjust the admit probability for the requested QoS level based on measuring network latency of RPCs processed at the requested QoS level.

16. The system of claim 15, wherein the priority class is one of a plurality of possible priority classes, and wherein the QoS level is one of a plurality of possible QoS levels.

17. The system of claim 15,
wherein each of the one or more RPCs received from the application includes an indication of priority class requested by the application, and
wherein controlling admission of the given RPC comprises determining, by the one or more processors, whether to admit the given RPC on a QoS level that is mapped to the indicated priority class.

18. The system of claim 15, wherein in controlling admission of the given RPC, the one or more processors are further configured to:
issue the given RPC at the lower QoS level.

19. The system of claim 15, wherein controlling admission of the given RPC comprises:
identifying service level objectives for the network latency;
determining, based on the identified service level objectives and the measured network latency, whether to admit the given RPC to the particular QoS level.

20. A non-transitory computer-readable medium storing instructions executable by one or more processors for performing a method, comprising:
mapping priority class of a remote procedure call (RPC) to a network quality of service (QOS) level;
receiving one or more RPCs; and
controlling, at RPC granularity, admission of a given RPC of the one or more RPCs to a particular QoS level using an admit probability for the particular QoS level, wherein the controlling comprises downgrading the given RPC from a requested QoS level to a lower QoS level; and
adjusting the admit probability for the requested QoS level based on measuring network latency of RPCs processed at the requested QoS level.

* * * * *